(12) United States Patent
Schwalbe

(10) Patent No.: US 6,758,973 B1
(45) Date of Patent: Jul. 6, 2004

(54) METHOD AND ARRANGEMENT FOR PURIFICATION OF WATER

(76) Inventor: Pontus Schwalbe, Box 10259, Stockholm (SE), S-10055

( * ) Notice: Subject to any disclaimer, the term of this patent is extended or adjusted under 35 U.S.C. 154(b) by 83 days.

(21) Appl. No.: 10/019,773

(22) PCT Filed: Jul. 4, 2000

(86) PCT No.: PCT/SE00/01423

§ 371 (c)(1),
(2), (4) Date: Apr. 5, 2002

(87) PCT Pub. No.: WO01/02310

PCT Pub. Date: Jan. 11, 2001

(30) Foreign Application Priority Data

Jul. 5, 1999 (SE) .............................................. 9902573

(51) Int. Cl.[7] .................................................. C02F 3/06
(52) U.S. Cl. ...................... 210/615; 210/631; 210/681; 210/151; 210/266; 210/906
(58) Field of Search ................................ 210/615, 631, 210/681, 150, 151, 258, 259, 280, 266, 906

(56) References Cited

U.S. PATENT DOCUMENTS

| | | | |
|---|---|---|---|
| 3,957,017 A | | 5/1976 | Carmignani et al. |
| 4,008,159 A | * | 2/1977 | Besik .......................... 210/151 |
| 4,118,320 A | * | 10/1978 | Stuart ......................... 210/280 |
| 4,246,101 A | * | 1/1981 | Selby, III .................... 210/615 |
| 4,370,234 A | | 1/1983 | Marsland |
| 4,772,307 A | * | 9/1988 | Kiss et al. .................. 210/631 |
| 4,997,562 A | | 3/1991 | Warner |
| 5,221,470 A | * | 6/1993 | McKinney .................. 210/151 |
| 5,316,668 A | * | 5/1994 | Tang .......................... 210/151 |
| 5,620,602 A | * | 4/1997 | Stuth .......................... 210/615 |
| 5,645,725 A | * | 7/1997 | Zitzelsberger et al. ...... 210/151 |
| 5,766,454 A | * | 6/1998 | Cox et al. ................... 210/615 |
| 6,080,314 A | * | 6/2000 | Rose .......................... 210/631 |

FOREIGN PATENT DOCUMENTS

DE 396921 12/1993

* cited by examiner

Primary Examiner—Christopher Upton
(74) Attorney, Agent, or Firm—Dowell & Dowell, P.C.

(57) ABSTRACT

A method and means for cleaning surface or waste water in which the water is supplied to a sludge separator (14) for the separation of suspendable material.

After the sludge separator the water is supplied to a biostep filter in which pollution is deposited at at least one filter body (42, 48) of permeable material of a type on which a bioskin may grow to create microprocesses without the permeability decreases and thereafter further to a sorbent filter (28, 40), whereby the water after this flows to a recipient. A pump (24, 124) is connected to the plant, preferably between the biostep filter (18, 42) and the sorbent filter (28, 40).

14 Claims, 4 Drawing Sheets

METHOD AND ARRANGEMENT FOR PURIFICATION OF WATER

BACKGROUND OF THE INVENTION

1. Field of the Invention

The present invention relates to a method for cleaning water, especially surface or waste water from buildings or roads, which water is directed to a sludge separator for separating suspended material. The invention also relates to means for carrying out the method.

2. Description of Related Art

Cleaning of sewage water from separate building or roads or small groups of houses has up til now been effected by a low degree cleaning wilt sludge separators, such as three compartment septic tanks. The water flows by gravity to the well in which coarse pollution sediment at the bottom of the wells. One to two times a year the well is emptied.

One type of sludge separator or septic tank is known from U.S. Pat. No. 4,997,562. The tank shown in this document is divided into a plurality of chambers in which the water to be cleaned is brought from each chamber to the next by means of a overflow valve so arranged that the chamber is filled with water up to a certain level before the water flow over to the next chamber. This is for preventing sedimented sludge to leave with the water. At the end of the separator a filter chamber is provided in which the water is filtered through sand and a fibrous organic material.

AT-B-396921 describes cleaning means in the form of a three compartment septic tank in which the water passes-one chamber for sedimenting sludge, one cleaning chamber and one filter bed. To increase the effect of the cleaning chamber, a plurality of walls are arranged so that the water is urged to flow in a loop through the chamber.

AT-363871 describes cleaning means with three or four chambers, namely, a sludge separator, a filter chamber, an aerating chamber and a final sedimenting chamber. In the filter chamber the water passes from the bottom of the chamber up through a biofilter.

Even if the use of sludge separators is an inexpensive and simple measure, the described cleaning measures, in accordance with higher environmental consiousness, are insufficient since they do not fully take care of biological material and/or phosphorus and not at all take care of heavy metals, which therefore come with the water to the recipient.

SUMMARY OF THE INVENTION

The main object of the invention is therefore to provide a method and cleaning means, which is simple and inexpensive to install and run, but notwithstanding this, result in a high degree cleaning of the water.

This object is achieved by giving the invention the features stated in the following claims.

BRIEF DESCRIPTION OF THE DRAWINGS

The invention will in the following be described in more detail in connection with embodiments, illustrated in the drawings, for the effectuation of the method.

DESCRIPTION OF THE PREFERRED EMBODIMENTS

Figure 1:
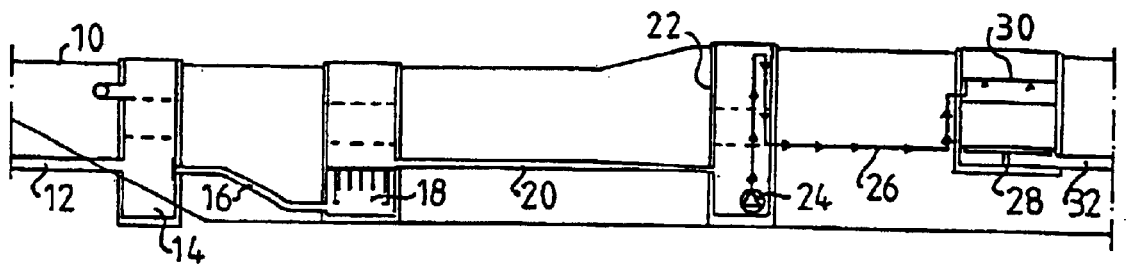
FIG. 1 illustrates schematically cleaning means according to the invention.

The plant illustrated in FIG. 1, may for example be used to take care of surface water at roads and the like. The water flows from an existing road embankment 10 or via a conduit 12 in a known way to a sludge separator, such as a three compartment septic tank 14, in which the most coarse particles sediment from the surface water and stay at the bottom of the well. The sedimented material in the well is emptied at regular intervals, for example 1 to 2 times per year. The water from the sludge separator. 14 is directed via a conduit 16 to a biostep filter 18 in which a degradation of biological material occurs, which is described in more detail below in connection with FIG. 4. The filter 18 has a surface of permeable, sintered pure polyethene on which microorganisms are acting. In the filter 18 the water rises through the filter insert to the level of a conduit 20, which directs the water to a pump station 22 in which a, for example, submersible pump 24 pumps the water to a level from which it, via a conduit 26, flows to a sorbent chamber 28 in which the water, via a manifold pipe 30 with nozzles, is spread and sprinkled over a sorbent material which reduces by an ion exchanger process the content of phosphorus and nitrogen of the water and where appropriate, also heavy metals. The sorbent material may comprise one or more materials, for example polonite™, a calcium silicate which is provided on a perforated bottom. The material is exchanged for example once a year and may after the reception of phosphorus and nitrogen be used as soil improvement agent. From the sorbent chamber flows now the high degree cleaned water via a conduit 32 to a recipient, which could be a lake, moss or the like.

Figure 2:
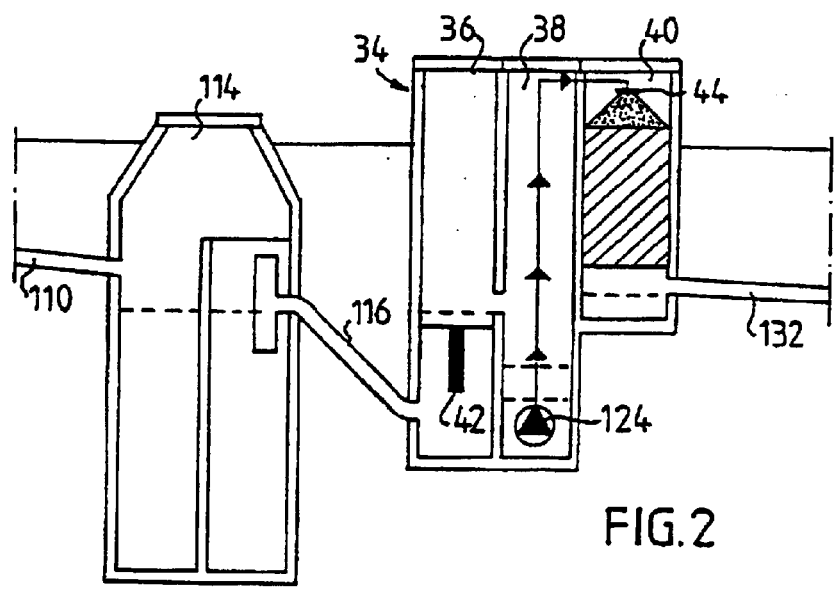
FIG. 2 illustrates another embodiment of cleaning means according to the invention.
Figure 3:
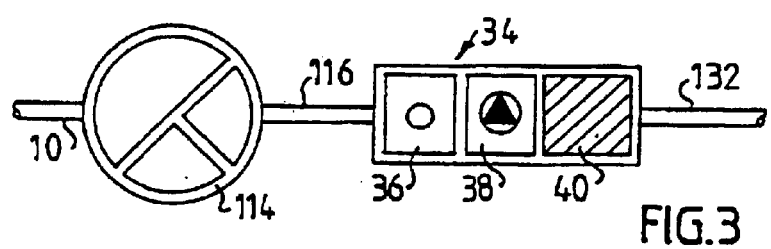
FIG. 3 illustrates a plan view of the means according to FIG. 2.
Figure 7:
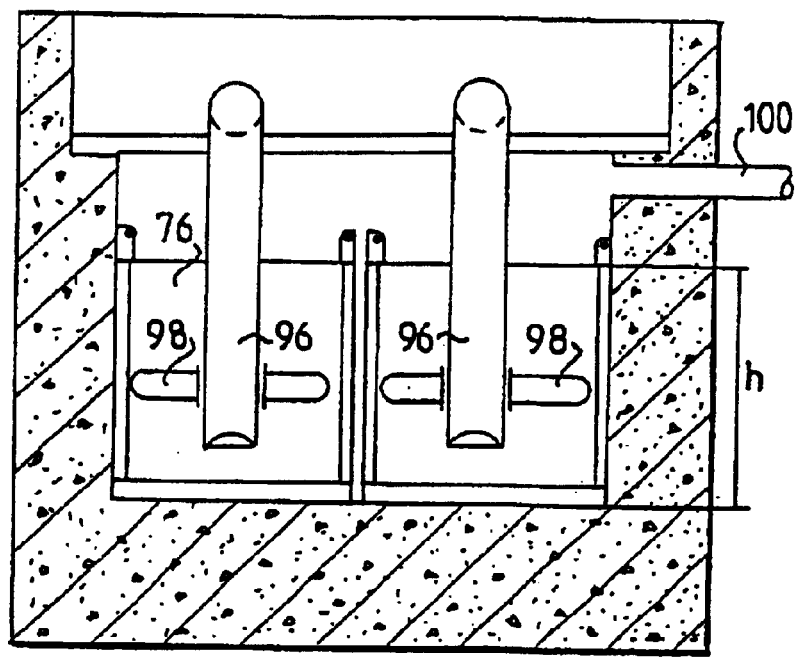
FIG. 7 illustrates a section like in FIG. 6 of an altered embodiment.

A The plant illustrated in the FIGS. 2 and 3 has in principle the same structure as the plant according to FIG. 1, but has a more compact embodiment for use as a smaller sewage plant, for example for separate houses or groups of houses in sparsely-populated areas. The parts comprised in the plant according to FIGS. 2 and 3 have thus obtained the same reference numerals as the corresponding parts in FIG. 1 with an additional 1 in front of the numeral. Thus, the waste water from a building or a group of houses is directed via a conduit 110 to a sludge separator 114, which for example is of the three compartment septic tank type. The desludged water is thereafter directed via the conduit 116 to the biostep filter of the plant, which filter comprises a compact house 34 divided into three chambers 36, 38 and 40 which comprises biostep filter, pump and sorbent filter respectively. The biostep filter has in this embodiment only a filter insert 42 provided in the filter chamber 36 and the water flows, after the passage through this insert 42, over to the pump chamber 38 where it is pumped by the pump 124 to the upper portion of the sorbent chamber 40 where it via a nozzle 44 is sprinkled and spread over the underlying sorbent material. The sorbent material may thus be a zeolite material or polonite™, as mentioned in connection with the description of FIG. 1. It is advantagously to stir the material, for example mechanically or by pumping (backflushing) the water through the material, to prevent clogging of the material and also to improve the cleaning effect. The water may also, instead of be sprayed over the material, be supplied through a conduit at the bottom of the sorbent material and pass upwards through the material to an outlet pipe provided above, which will be described in more detail in connection with FIG. 7. The cleaned water is directed via the conduit 132 to a recipient.

Figure 4:
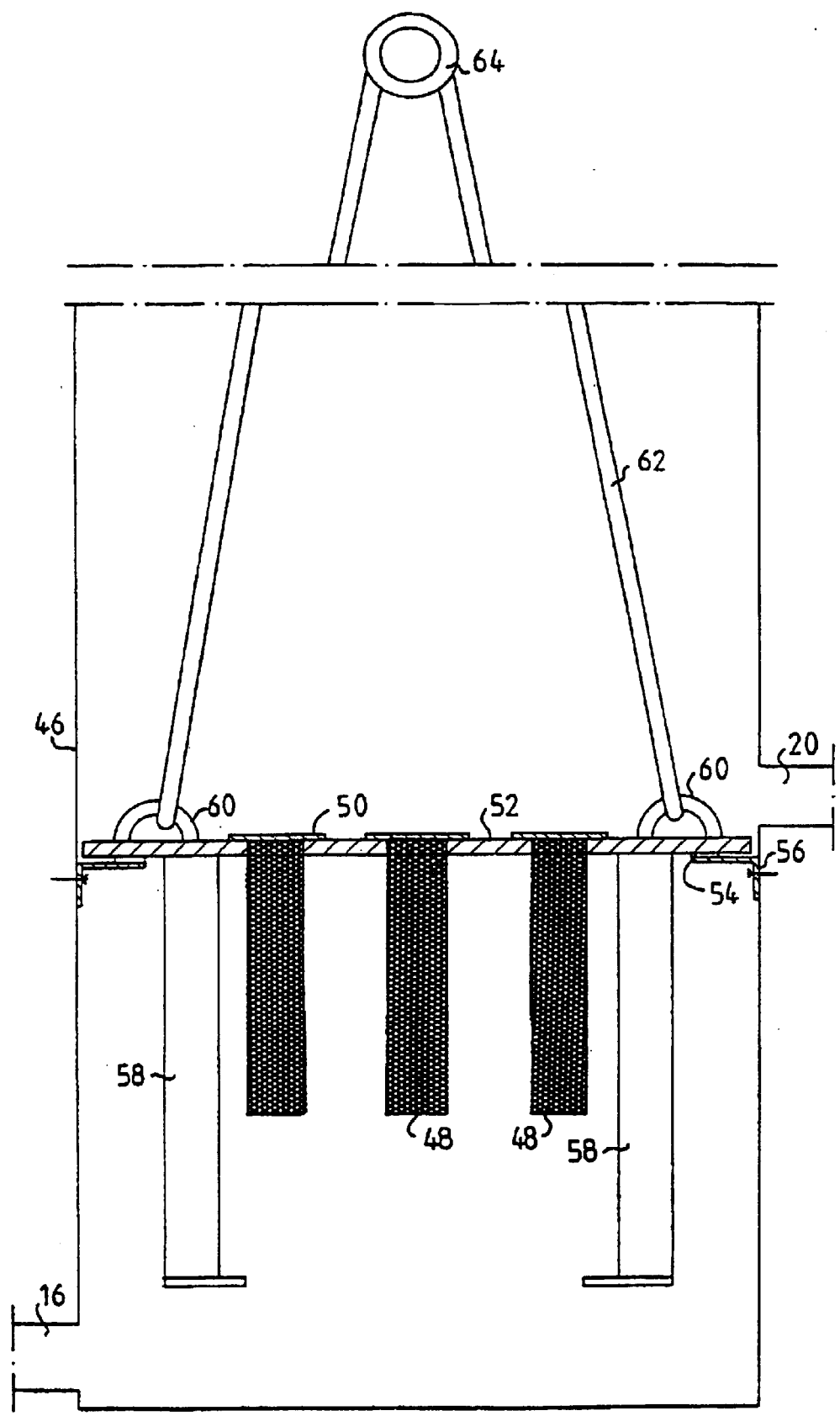
FIG. 4 illustrates in a larger scale a section through a biostep filter, which may be used in the plants according to FIGS. 1 and 2.

In FIG. 4 the bio step filter 18 of FIG. 1 is illustrated in a larger scale. The water flows into the lower part of the filter chamber 46 from the conduit and rises upwards in the filter chamber by hydrostatical pressure and passes through the cylindrical filters 48. Their cylindrical or pipeshaped filter bodies 48 are of a permeable material, such as sintered pure polyethene, which forms the bottom and walls of the pipe, while the pipe is open upwards. The permeable material is of a type on which, by means of microorganisms, a bio skin may grow to create micro processes without lowering the permeability. The filters 48 lowers in this way BOD-content in waste water and prevent suspended material to reach the following sorbent filter. Thus, at the filters a coating of deposited pollution is formed, which may be flushed clean at regular intervals, for example one to two times a year. The filter bodies 48 are provided, at the top around the opening, with an upper flange 50 with its aid they are sealingly inserted in a plate 52, which in turn, with an inbetween support of a seal 54, rest on a bracket 56 provided around the inner periphery of the chamber 46. The plate 52 is provided with struts 58 with which the insert with the filters 48 may be placed on the ground outside of the well for washing of the filters 48 and which struts 58 are dimensioned in such a way that their weight keeps the plate 52 with the filters 48 pressed against the seal 54 against the pressure of the through flowing water.

For lifting the filter insert out of the well 46, the plate is provided with mountings 60 for a lifting yoke 62, which is provided at the top with a ring 64 for connection to a lifting hook (not shown). The water which comes in through the conduit 16 flows through the permeable mantle surface of the filters 48 while depositing pollution on said surface, as described above, into the inner of the pipeshaped filters and flow out from the opening of the filters 48 above the plate 52 and further to the outlet conduit 20, which leads to the pump station 22.

Figure 5:
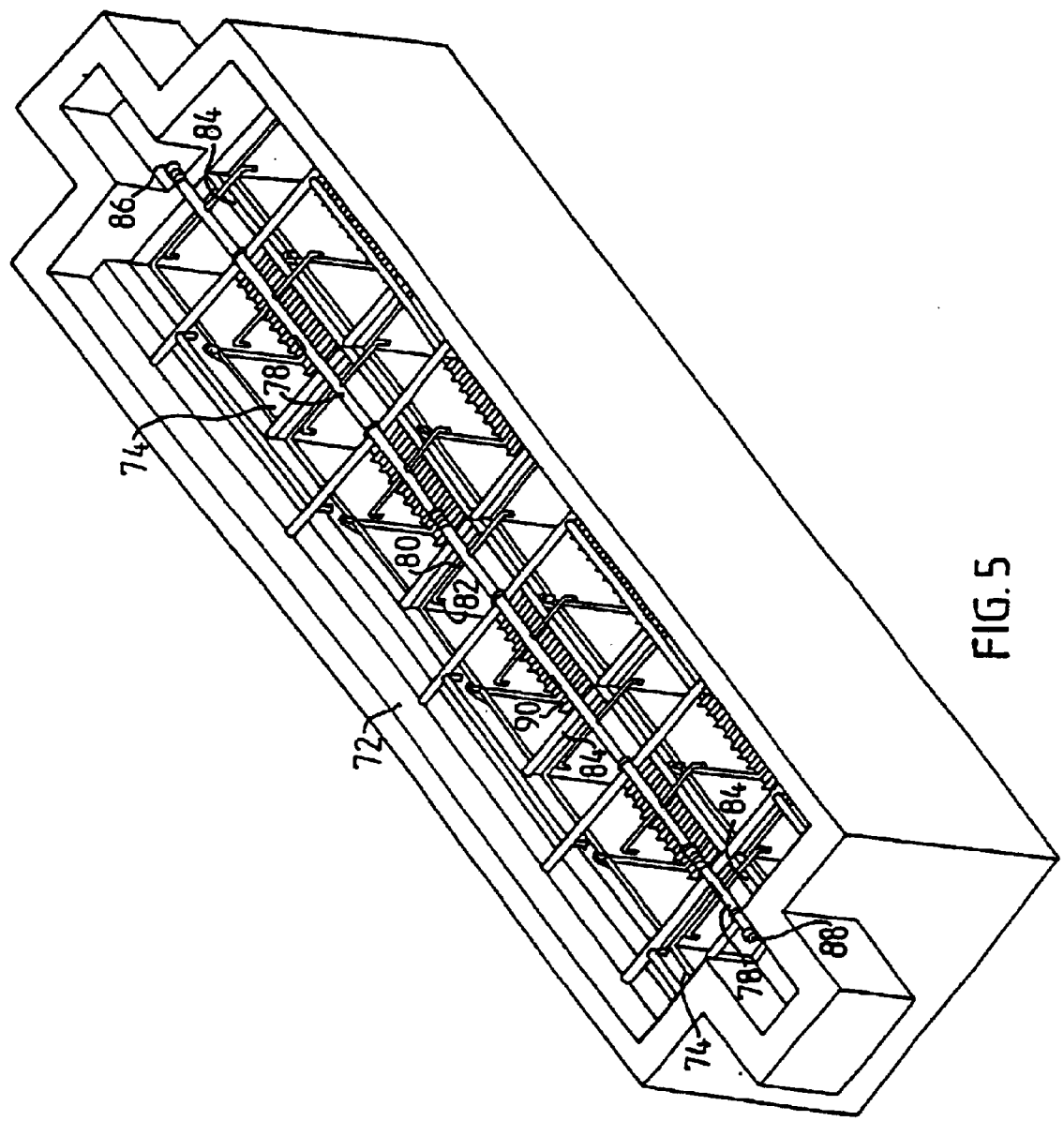
FIG. 5 illustrates in a perspective view an altered embodiment of a sorbent chamber.
Figure 6:
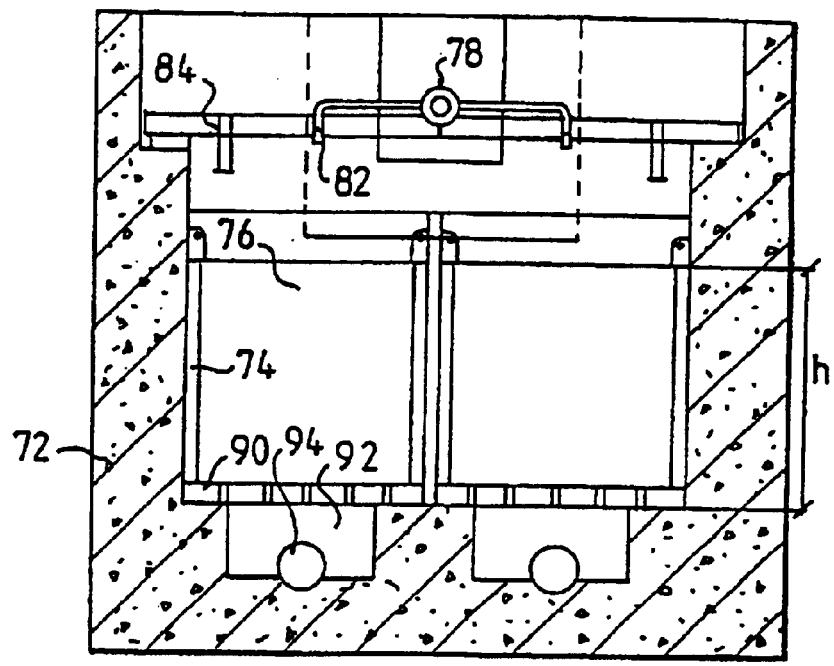
FIG. 6 illustrates a section through the chamber of FIG. 5.

The sorbent chamber 70 illustrated in FIGS. 5 and 6, which may be inserted instead of the sorbent chamber 28 in FIG. 1, comprises a concrete bed 72 in which a number of receptacles 74 are provided, which comprises the sorbent material 76 (FIG. 6), for example of the type previously mentioned in connection with FIGS. 1 and 2. As emerges from FIG. 6, the sorbent material 76 is filled up in the receptacles 74 to a level "h". Above the receptacles 74 is a water supply system provided comprising a central pipe 78 and to this, above every pair of receptacles 74, connected spray nozzle holder 80 for supporting nozzles or spray nozzles 82, whereby the pipe 78 and the holder 80 rest on beam profile 84. The pipe 78 is at its far end closed by a terminal end 86, while the fore end has connection means 88 for connection with a supply conduit for the water, such as the conduit 26 in FIG. 1. The sorbent material 76 in each receptacle 74 rest at a bottom 90 of a net or trellis-fabric so that the water after passing the sorbent material 76 may run down into a channel 92 arranged under the bottom 90 and from there via an outlet pipe 94 to a recipient At the embodiment illustrated in FIG. 7 of the sorbent chamber, supply pipes 96 for the water are brought down into the sorbent material 76 with the height h, which pipes open at the bottom of the material. At the supply pipes 96, agitators 98 is journalled, which stir and keep the sorbent material 76 in movement. This may, as mentioned above, be polonite™, whereby the stirring of the material is done to prevent the forming of lumps and also to improve the cleaning effect. After the water has passed through the sorbent material to its upper portion it is directed away via the conduit 100 to a recipient.

As emerges from the above, a method and means according to the invention are provided for taking care of surface and waste water in an effective and inexpensive way even though a high degree cleaning of the water is obtained so that it without impact on the environment may be released to a natural recipient, such as a lake, river or moss. Further, the sludge separated in the sludge separator 14 may after suitable processing, such as composting, be used as soil improving agent and the sorbent material in the sorbent chamber 28, which is a natural material with high phosphorus binding capacity, may likewise be used as soil improving agent as it also easily emits phosphorus again to the vegetation.

What is claimed is:

1. A method for cleaning surface or waste water, including the following successive steps of:
   A. supplying the water to a sludge separator and separating suspended material therefrom,
   B. thereafter lowering a BOD content of the water by supplying the water to at least one biostep filter and passing the water through a permeable material of a type permitting growth of a bioskin thereon thereby creating a micro process without lowering the permeability of the material, whereby biological pollutants are deposited on the at least one biostep filter,
   C. thereafter reducing a content of metals which may include phosphoric and heavy metals from the water in an ion exchange process by forwarding the water to a sorbent chamber including a filter of a sorbent material, wherein the water is distributed over the sorbent material and flows through the sorbent material, and
   D. thereafter forwarding the water to a recipient, wherein the at least one biostep filter prevents organic material from growing on the sorbent material of the sorbent chamber filter.

2. The method according to claim 1, wherein the sorbent material is a material having a high phosphorus and heavy metal binding capacity.

3. The method according to claim 1 including stirring the sorbent material.

4. The method according to claim 1 including the water to be cleaned is sprinkled over the sorbent material.

5. The method of claim 1 wherein said at least one biostep filter includes a sintered material.

6. The method according to claim 5, wherein the sintered material is pure polyethene.

7. A plant for cleaning surface or waste water, including:
   a sludge separator (14) for coarse separating of suspendable material, a biofilter (18, 36) provided after the sludge separator for degradation of biological material, said biofilter including at least one biostep filter of a permeable material which permits the water to pass therethrough and which permits growth of a permeable bioskin thereon for creating a micro process without lowering the permeability of the material, whereby a deposition of biological pollution takes place at the biostep filter, a sorbent chamber (28, 40) provided after the biofilter (18, 36) and including a filter of a sorbent material, means for distributing the water over the sorbent material to permit the water to flow through the sorbent material, wherein the sorbent material is adapted to permit a reduction of metals and phosphorus and by means of an ion exchange process, and a pump station (22,38) for maintaining a flow of the water through the plant and supplying it to a recipient wherein the at least one biostep filter prevents organic material from growing on the sorbent material of the sorbent chamber filter.

8. The plant according to claim 7, wherein the at least one biostep filter includes at least one pipe shaped body (42,48) of a permeable material arranged so that the water flows from outside of the at least one body to an inside thereof while depositing biological pollution at an external mantle surface of the at least one pipe shaped body.

9. The plant according to claim 8, wherein the sorbent filter comprises manifold means (30, 44) for distribution of the water over the sorbent material, said manifold being provided at a perforated bottom in the sorbent filter.

10. The plant according to claim 8 wherein the at least one pipe shaped body is inserted in a plate (52) and has an opening from an inner portion of the at least one body which opens above the plate (52) and which is sealingly mounted in a filter chamber (36, 46) in which the water flows by way of an inlet conduit (16, 116) into the chamber underneath the plate (52) and through the at least one body to an upper side of the plate (52) and from there to an outlet (20) from the filter chamber.

11. The plant according to claim 10, wherein the plate (52) has struts (58) directed downwards which are dimensioned so that they force the plate, against hydrostatic pressure of the water, against a support bracket (56) provided at an inner periphery of the filter chamber, and a seal (54) provided between the support bracket (56) and the inner periphery of the filter chamber.

12. The plant according to claim 7 wherein the sorbent filter includes an agitator (98) for stirring of the sorbent material.

13. The plant according to claim 7 wherein the biostep filter, the sorbent filter and the pump station are provided in a compact housing (34) divided into three corresponding chambers.

14. The plant according to claim 7 wherein the sorbent filter includes a chamber (72) in which a plurality of receptacles (74) with sorbent material are inserted.

* * * * *